(12) United States Patent
Winzenried et al.

(10) Patent No.: US 11,269,943 B2
(45) Date of Patent: Mar. 8, 2022

(54) SEMANTIC MATCHING SYSTEM AND METHOD

(71) Applicant: JANZZ Ltd, Zurich (CH)

(72) Inventors: Stefan Winzenried, Kilchberg (CH); Adrian Hossu, St. Gallen (CH)

(73) Assignee: JANZZ LTD, Zurich (CH)

( * ) Notice: Subject to any disclaimer, the term of this patent is extended or adjusted under 35 U.S.C. 154(b) by 300 days.

(21) Appl. No.: 16/593,309

(22) Filed: Oct. 4, 2019

(65) Prior Publication Data
US 2020/0104315 A1 Apr. 2, 2020

Related U.S. Application Data

(63) Continuation-in-part of application No. 16/045,902, filed on Jul. 26, 2018, now Pat. No. 11,113,324.

(51) Int. Cl.
*G06F 16/00* (2019.01)
*G06F 16/36* (2019.01)
*G06F 16/35* (2019.01)

(52) U.S. Cl.
CPC .......... *G06F 16/367* (2019.01); *G06F 16/355* (2019.01)

(58) Field of Classification Search
CPC .............................. G06F 16/367; G06F 16/355
USPC .......................................................... 707/769
See application file for complete search history.

(56) References Cited

U.S. PATENT DOCUMENTS

| | | | | |
|---|---|---|---|---|
| 6,523,026 B1* | 2/2003 | Gillis | ................ | G06F 16/3332 |
| 7,251,637 B1* | 7/2007 | Caid | ................ | G06K 9/4623 |
| | | | | 706/15 |
| 7,542,958 B1* | 6/2009 | Warren | ................ | G06N 5/02 |
| | | | | 706/48 |
| 9,558,271 B1* | 1/2017 | Sathe | ................ | G06F 16/367 |
| 10,860,803 B2* | 12/2020 | Fung | ................ | G06Q 10/067 |
| 10,891,673 B1* | 1/2021 | Sawaf | ................ | G06F 16/248 |
| 11,010,696 B2* | 5/2021 | Xiong | ................ | G06F 40/279 |
| 11,036,764 B1* | 6/2021 | Zelenov | ................ | G06F 16/285 |
| 11,062,240 B2* | 7/2021 | Goyal | ................ | G06N 7/005 |
| 11,100,179 B1* | 8/2021 | Zhou | ................ | G06N 5/027 |
| 2002/0042793 A1* | 4/2002 | Choi | ................ | G06F 16/335 |
| 2003/0177112 A1* | 9/2003 | Gardner | ................ | G06K 9/6272 |

(Continued)

FOREIGN PATENT DOCUMENTS

WO 2012122122 A1 9/2012

OTHER PUBLICATIONS

Extended European Search Report in corresponding European Patent Application No. 19210788.6, dated Aug. 28, 2020.

(Continued)

*Primary Examiner* — Thanh-Ha Dang
(74) *Attorney, Agent, or Firm* — Leason Ellis LLP

(57) ABSTRACT

A computer-based system and method for determining similarity between at least two heterogenous unstructured data records and for optimizing processing performance. A plurality of occupational data records is generated and, for each of the occupational data records, a respective vector is created to represent the occupational data record. Each of the vectors is sliced into a plurality of chunks. Thereafter, semantic matching of the chunks occurs in parallel, to compare at least one occupational data record to at least one other occupational data record simultaneously and substantially in real time. Thereafter, values representing similarities between at least two of the occupational data records are output.

14 Claims, 8 Drawing Sheets matching process

(56) References Cited

U.S. PATENT DOCUMENTS

| | | | | |
|---|---|---|---|---|
| 2007/0097959 A1* | 5/2007 | Taylor | H04L 67/104 | 370/352 |
| 2007/0143322 A1* | 6/2007 | Kothari | G06F 40/194 | |
| 2011/0040760 A1* | 2/2011 | Fleischman | G06F 3/048 | 707/737 |
| 2012/0137367 A1* | 5/2012 | Dupont | G06F 21/00 | 726/25 |
| 2013/0018900 A1* | 1/2013 | Cheng | G06F 7/00 | 707/755 |
| 2013/0117161 A1* | 5/2013 | Waidmann | G06Q 30/06 | 705/27.1 |
| 2015/0067078 A1* | 3/2015 | Enoki | G06Q 50/01 | 709/206 |
| 2015/0173655 A1* | 6/2015 | Demmer | A61B 5/1118 | 600/595 |
| 2016/0162779 A1* | 6/2016 | Marcus | G06N 20/10 | 706/12 |
| 2016/0180479 A1* | 6/2016 | Khanzode | G06F 16/355 | 705/311 |
| 2016/0232160 A1* | 8/2016 | Buhrmann | G06F 40/14 | |
| 2017/0069043 A1* | 3/2017 | Doyle | G06F 16/24575 | |
| 2017/0185637 A1* | 6/2017 | Liu | G06F 16/2228 | |
| 2018/0060409 A1* | 3/2018 | Bhattacharya | G06F 16/2237 | |
| 2018/0150784 A1* | 5/2018 | Wang | G06N 7/005 | |
| 2018/0253655 A1* | 9/2018 | Wang | G06F 16/27 | |
| 2019/0129964 A1* | 5/2019 | Corbin, II | G06F 40/279 | |
| 2019/0295101 A1* | 9/2019 | Porter | G06Q 30/018 | |
| 2019/0303836 A1* | 10/2019 | Goyal | G06N 3/08 | |
| 2020/0050657 A1* | 2/2020 | Uchide | G06F 17/16 | |
| 2020/0279226 A1* | 9/2020 | Carnicelli | G06Q 10/06 | |
| 2021/0049196 A1* | 2/2021 | Trim | G06F 16/3334 | |

OTHER PUBLICATIONS

"Janzz.Technology: ""JANZZclassifier!"", Jun. 30, 2017 (Jun. 30, 2017), pp. 1-2, XP055627494, Retrieved from the Internet: URL:https://web.archive.org/web/20170630102009/https://janzz.technology/our-products/janzzclassifier/ [retrieved on Oct. 1, 2019]".

European Search Report corresponding to European Patent Application No. 19186111, 11 pages.

* cited by examiner matching process

SEMANTIC MATCHING SYSTEM AND METHOD

CROSS-REFERENCE TO RELATED APPLICATIONS

This patent application is based on and claims priority to U.S. patent application Ser. No. 16/045,902, filed on Jul. 26, 2018, and entitled CLASSIFIER SYSTEM AND METHOD, the entire contents of which are hereby incorporated by reference as if set forth expressly in its entirety herein.

TECHNICAL FIELD OF THE INVENTION

This patent application relates, generally, to the field of electronic information matching and, more particularly, to computer-implemented systems, methods, and computer program products for comparing at least two heterogeneous data records contained in different data sets to determine a degree of similarity.

BACKGROUND OF THE DISCLOSURE

Semantic matching of data is known. In the occupational sector, for example, semantic matching principally is based on a keyword-based approach, in which data are searched for words which literally correspond to a set of given keywords. The more keywords that are found, the better the match is assumed to be. In some cases, particular algorithms and/or advanced word-vectors are employed, which are considered herein to be among the natural language processing ("NLP") similarity techniques. For example, one or more algorithms employ word similarity purely on the level of strings and sentences, whereby the underlying semantic context, culture specific peculiarities and multilingual differences are largely, if not completely, ignored.

Moreover, the significance of certain occupational criteria (e.g. one or more particular skills, specializations, and/or experiences) that can match a specific occupation is not considered by a method that simply compares literal strings and sentences. Therefore, occupation-specific, regional, cultural and/or language-related differences are not considered either, notwithstanding the impact on relevance that these criteria have on particular criteria. Take, for example, two job candidates for an open vacancy, whose profiles differ only in two criteria, namely occupation title, which could be quite similar, and a skill. A purely keyword-based approach is not effective for determining which of the two candidates would be suited to the position, as specific information about the relevance of their respective skills regarding the targeted vacancy would be needed. Further, manual classification or individually self-prioritization is tedious and impractical, particularly for finding matches on large data sets, which can include a collection of data records, such as occupational data records.

Moreover, and with consideration of various technical aspects, semantic matching on very large data sets poses serious challenges. For example, vector operations are performed in a high dimensional vector space, which requires the data to be prepared, and many calculations to be performed efficiently, which existing systems may not have solved in an optimal way, particularly in terms of performance. Thus, keyword-based approaches as well as NLP similarity techniques show significant weaknesses when it comes to comparing heterogeneous data records in culturally diverse, multilingual domains, such as the occupational sector, due to an information gap which lowers the accuracy of those matching results, and additionally, due to a probabilistic error these approaches may bring regarding contextual correctness.

It is with respect to these and other considerations that the disclosure made herein is presented.

SUMMARY OF CERTAIN EMBODIMENTS OF THE DISCLOSURE

In one or more implementations, the present application includes systems and methods for determining similarity between at least two heterogenous unstructured data records and for optimizing processing performance. Furthermore, at least one processor that is configured by executing code stored on non-transitory processor readable media is configured to generate a plurality of occupational data records. The at least one processor can create, for each of the occupational data records, a respective vector to represent the occupational data record. The at least one processor can slice each of the vectors into a plurality of chunks, and perform semantic matching for each of the chunks in parallel to compare at least one occupational data record to at least one other occupational data record simultaneously and substantially in real time. Moreover, the at least one processor can output values representing similarities between at least two of the occupational data records.

In one or more implementations, each of the vectors has magnitude and direction.

In one or more implementations, the at least one processor can create an n-dimensional non-orthogonal unit vector space.

In one or more implementations, the n-dimensional non-orthogonal unit vector space is created by calculating dot products between unit vectors corresponding to concepts from an ontology.

In one or more implementations, each vector is in a high dimensional non-orthogonal unit vector space.

In one or more implementations, the at least one processor can apply correlation coefficients derived from information provided by an ontology.

In one or more implementations, the at least one processor can weight vectorially represented concepts.

In one or more implementations, the at least one processor can store information associated with dot products that are above zero or at least equal to a predefined threshold.

In one or more implementations, the matching step includes performing asymmetric comparisons.

In one or more implementations, the asymmetric comparisons are based on cosine similarity.

In one or more implementations, the output is sorted based on degree of similarity.

These and other aspects, features, and advantages can be appreciated from the accompanying description of certain embodiments of the invention and the accompanying drawing figures.

DETAILED DESCRIPTION OF CERTAIN EMBODIMENTS OF THE INVENTION

Figure 1:
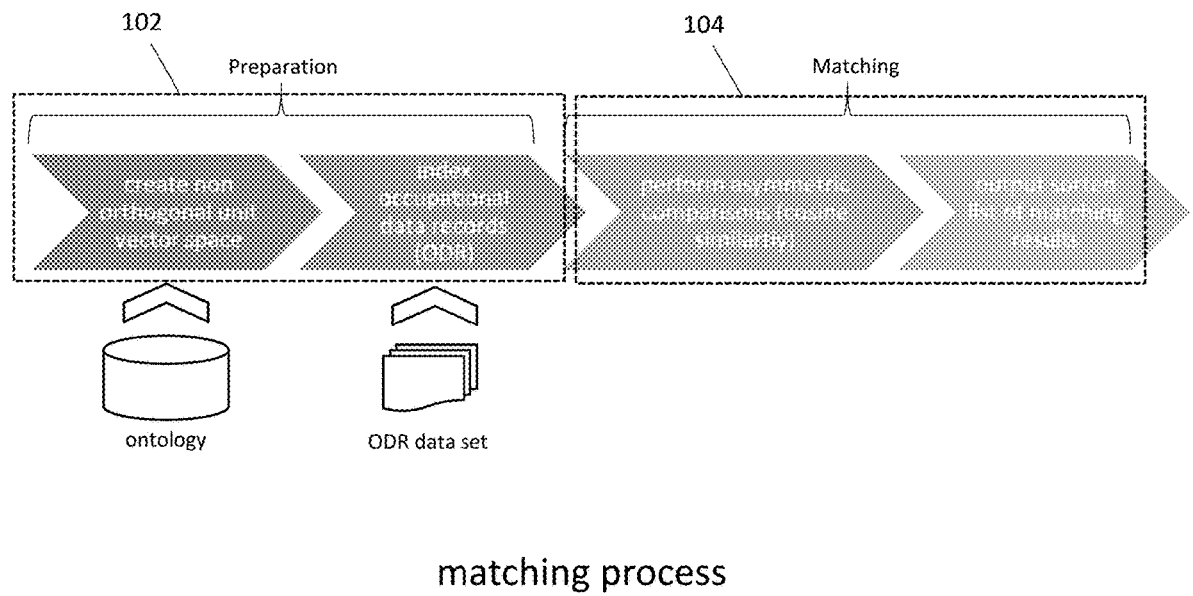
FIG. 1 is a simple block diagram that illustrates a matching process in connection with an example implementation of the present application

By way of overview and introduction, the present disclosure details systems and methods for comparing at least two heterogeneous occupational data records contained in different data sets up to a very large amount of occupational data records against each other, and generating a numerical score that represents the degree of similarity between the information contained in them as a function of a predefined set of criteria. As used herein, the term, heterogeneity, particularly when used in conjunction with occupational data records, describes data records whose criteria (e.g., concepts) may differ in number and type. Such differences can result, for example from different languages, different occupation descriptions, or different skills. The comparison between the occupational data records is performed by representing each occupational data record as a vector in a high dimensional, non-orthogonal unit vector space, and applying correlation coefficients derived from empirical human expertise provided by an ontology.

As used herein, the term, ontology refers, generally, to a complex data structure containing a large number of occupational concepts and the logical relations between them. Relations can be of hierarchical nature (e.g., parent-child, grandparent-grandchild) or they can express different types and degrees of similarity.

Thereafter, a sorted list of normalized scores, typically in the range of 0 to 1, is computed for the degree of cosine measure between the occupational data record vectors as output. In one or more implementations, a value of 1 represents a perfect match. In accordance with the present application, examples of such occupational data records include an open or vacant job position, a candidate's job search, a profile of a worker at a company, or other unit of occupational information. The data records which are compared during the matching processes can include, as noted above, a set of criteria or data points which are referred to herein, generally, as "concepts."

In operation, prior to a step of matching, vectorially represented concepts within each occupational data record are weighted according to a customizable weighting system dependent on the level of specificity (OC) of the occupation description. By slicing the indexed occupational data record vectors into data chunks, parallel processing is enabled to compare large amounts of occupational data records in substantially in real time. In one or more implementations of the present application, a collection of modules operating as virtual engine, which is referred to herein, generally, as a semantic matching engine.

As used herein, a "match" can refer to an operator that takes two graph-like structures and produces a mapping between the nodes of these graphs that correspond semantically to each other. Semantic relations can be computed to determine equivalence and to analyze the meaning (concepts, not labels) elements and the structures of schemas. The ontology of the present application, from which correlation coefficients are gained in order to perform a semantic match, and includes great granularity and diversification of semantic relations. For example, a category of relations referred to herein, generally, as "same but different" can express several different degrees of similarity. This enables much broader spectrum of coverage than only equivalence, overlapping or disjointedness. Furthermore, in ontology the present application, the direction of comparison, the viewpoint of comparison is considered as well.

The semantic matching engine of the present application is particularly effective in the area of occupational data analytics, including in the realm of occupation, industry, language, country and culture specific diversity. The semantic matching engine of the present application is a significant improvement over known similarity techniques, such as employed in natural language processing, which cannot bridge an information gap of knowing a particular occupational context and inferences that can be gained from the interrelations between the occupational data points. The present application, including the semantic matching engine, operates to take into consideration these respective data and perform improved data analytics.

In one or more implementations, a semantic context is determined as a function of correlation coefficients that are derived from ontology. Based on ontology, which can represent a set of concepts and categories in a subject area or domain, as well as respective relations there-between, access to the information contained in the relationships of terms between terms can be ascertained. This, in addition to occupational terms and sentences, enables various terms being represented in the ontology as concepts that describe a concrete occupation, skill, specialization, education, experience, or the like.

Moreover, and in the context of semantics, information relating to an occupation, such as architect, is related to other skills, such as process management, time and cost planning of projects, quality assurance and general management. It is recognized herein that information associated with such semantics, as well as nuanced information associated with various cultural contexts, cannot be retrieved simply by keyword-based matching or NLP similarity.

The correlation coefficients originating from the ontology can further be based on the experience of subject matter experts, which can increase accuracy for similarity comparisons. Unlike keyword-based matching or approaches using NLP similarity techniques only, ontology-based correlation coefficients generated in accordance with the teachings herein do not have shortcomings associated with semantic misinterpretations (e.g., deviation error) and therefore constitute an added-value for semantic matching.

Moreover, and in connection with prioritizing occupational criteria dependent on a respective occupation, the semantic matching engine of the present application can include a sophisticated weighting system, including to weigh concepts belonging to occupational data records. Weights can be applied to concepts of different types differently, depending on the occupation class assigned to the occupational data record. Accordingly, different occupations are considered when weighting criteria for only respective skills, specializations, experiences, educations and other criteria which are truly significant for that specific occupation can be given a higher weight. As an example, the capacity to stand upright in the same position for long hours may be essential for a dentist, in contrast to the cashier, where it may be not relevant at all. Regional variations of such a weighting distribution can be covered through customization of a custom weighting table.

Sets of occupation data, such as relating to job seekers and job offerors, are typically complex data sets that are unstructured or semi-structured and not specific to a particular standardized classification system associated with a corresponding taxonomy. Each set of occupation data is semantically interpreted and analyzed in view of a given standardized classification system for the purpose of identifying one or more defined, standardized "concepts" from the classification system that best match a given set of occupation data. Furthermore, the exemplary systems and methods are further configured to convert the unclassified data-sets into structured records of standardized occupation data, wherein the occupation descriptions are expressed according to one or more prescribed classification systems. Furthermore, sets of occupation data can be augmented or enhanced by intelligently annotating the data with additional, standardized, occupation data inferred from the analysis.

Accordingly, it can be appreciated that, through the specific technical solution described herein for classification and standardization, the disclosed embodiments translate unstructured and unstandardized information sets, which are, due to their inconsistent and uncategorized nature, not suitable for analysis using existing data-processing and analytical systems, into more meaningful information sets that are structured and defined according to any of a number of defined classification systems. Thus, the disclosed embodiments are specifically configured to generate new and enhanced sets of occupational data that are more suitable for further data-analytics processes, such as benchmarking, matching or statistical analyses; the generated data enables deeper and more meaningful insights to be drawn therefrom. The disclosed embodiments can similarly be used to analyze and translate (e.g., "classify") occupation data that is already standardized according to one particular classification system into a different classification system, to facilitate further processing.

The present application further takes account of linguistic differences, including by generating different, language specific labels and different concepts in the ontology, as needed. Additionally, individual proficiency levels for skills, languages, educations and experiences can be defined, per occupational data record. Still further, the present application handles handle vector operations on a high dimensional vector space (e.g., approximately 10k dimensions). In one or more implementations, known vectors are pre-calculated, thereby avoiding unnecessary calculations, and only relevant values are stored in memory and parallel processing is applied during actual semantic matching.

More particularly, the matching process can be split into two main phases: a data pre-calculation phase (preparation) and a matching phase. During the preparation phase, occupational data record vectors can be calculated in the high dimensional vector space. Through normalizing the occupational data record vectors as early as possible, unnecessary dot product calculations can be avoided. Further, not saving zero values, which can result from disjoint concepts, no unnecessary comparisons during matching are performed. Furthermore, unfitting occupational data records are excluded in advance by filtering the occupational data record data set using predefined filter criteria. The pre-calculation saves time during the actual matching, but to ensure optimal performance during the actual comparison of the occupational data record, the pre-calculated data are sliced into chunks, which are then processed in parallel to calculate the cosine similarity measures, substantially in real time.

As used herein, an occupational data record ("ODR") describes a unit of closely related occupational data, and can include a list of occupational concepts and some additional attributes such as occupational data record type. An occupational data record may be created manually or automatically from information describing a vacancy for a new position, a candidate's job search, information related to a cv, a worker profile, or any other type of occupational information. The information can be mapped to concepts which then form the occupational data record.

Referring to the drawings, in which like reference numerals refer to like elements, FIG. 1 is a simple block diagram that illustrates a matching process in connection with an example implementation of the present application. As illustrated in FIG. 1, two principal phases (preparation phase 102 and matching phase 104) are shown. Both phases can be performed asynchronously, whereby an initial preparation phase occurs prior to the matching phase.

During preparation, an n-dimensional, non-orthogonal unit vector space can be created, such as by calculating the dot products between all the unit vectors corresponding to the concepts from the ontology. All of the dot products which result in a value of zero and/or a value below a certain custom threshold are preferably not stored. Single factors to calculate the dot products may be unknown, however the dot products per se are known, at least because they correspond to the given correlation coefficients from the ontology. Thereafter, nonrelevant ODR's are filtered out of the data set, for example, based on a list of predefined filter criteria. Examples of such filter criteria can include location, industry, and contract type.

ODR vectors, which can include linear combinations of the unit vectors in the non-orthogonal vector space, can be generated by assigning a weight for each component (e.g., concept) of the ODR vector using a custom weights table. The weights on the table can be based on a categorization of an ODR into an occupation class (OC). As used herein, an occupational class refers, generally, to a level of specificity for the description of an occupation. For example, whether belonging to a concept describing an occupation title, ranging from 1—very specific. (e.g., a PYTHON programmer) to 5—very vague/broad (e.g., consultant). The OC categorizes an occupation into a level of specificity, such as ranging from 1 to very specific (e.g., an "embedded C/C++ developer") to 5—very vague (e.g. a "consultant" or a "project manager"). In one or more implementations of the present application, for every concept of an ODR, the vector components are multiplied by one or more assigned weights. Furthermore, information of individual proficiency levels for skills, languages, educations and experiences which were previously set by the user can be included when representing ODR's as vectors. The procedure of expressing the ODR vectors in the non-orthogonal vector space, which comprises filtering out nonrelevant ODR's previously and assigning weights to the concepts of that ODR vectors, is referred to herein, generally, as indexing.

Continuing with reference to FIG. 1, after preparation phase 102 is completed, matching 104 can be performed. The ODR vectors that were pre-calculated with the empirical correlation coefficients and implied from the ontology (e.g. dot products of the unit vectors), an adapted form of cosine similarity calculation and referred to herein, generally as soft cosine measure, is performed while comparing two data sets against each other. The two data sets include a first data set containing a single ODR, and a second data set containing n ODR's (where n=1 . . . many). This results in a list of cosine similarity measures, typically in the range between 0 and 1. The result list is sorted, showing the best measures (e.g. the best matches) at the top of the list.

Figure 2:
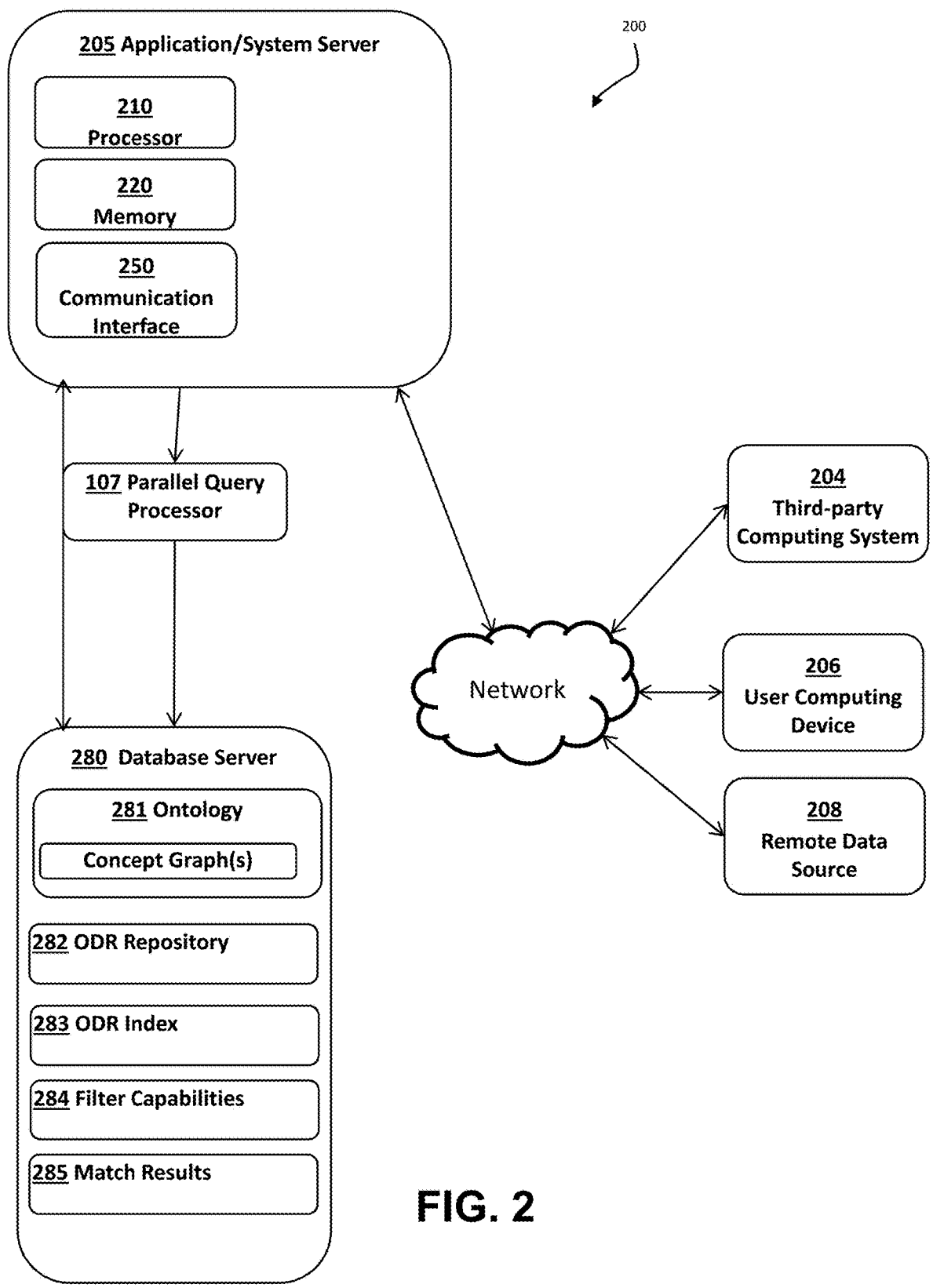
FIG. 2 is a high-level diagram illustrating an exemplary topology and configuration of a system, in accordance with an example implementation disclosed herein.

Referring now to FIG. 2, a block diagram is shown illustrating a topology and high-level architecture (system 200) in accordance with an example implementation of the present application. An exemplary computer system is shown as a block diagram in FIG. 2, which presents a high-level diagram illustrating a configuration of a system for classifying occupational data in accordance with one embodiment of the present invention. In this arrangement, the system 200 includes an application/system server 205. Also shown are remote computing devices in communication with the system server 205 including a third-party computing system 204, and a user personal computing device 206. The system server and one or more of the other remote computing devices can also be in communication with one or more data storage devices, such as the database server 280 and a remote data source 208.

The system server 205 is intended to represent various forms of digital computing devices and/or data processing apparatus such as servers, blade servers, mainframes, and other appropriate computers and/or networked or cloud-based computing systems that are capable of communicating with remote computing devices, data storage devices and computing networks, including receiving, transmitting and storing electronic information, as well as processing information as further described herein. The database server 280 and third-party system 204 are also intended to represent similar computing devices to implement respective functionalities.

User device 206 enables a user to interact with a remote computing device, such as system server 205 and database server 280 over the network, as shown. User device 206 can be any device capable of communicating with a server and receiving input directly from a user, for example, a personal computer, a tablet computing device, a personal digital assistant (PDA), a cell phone or other types of computing devices, as will be appreciated by persons skilled in the art.

The database server 280 can contain and/or maintain various data items and elements that are utilized throughout the various operations of the system 200. The information stored by the database server 180 can include, but is not limited to, information relating to one or more ontologies 281 (including concept graph(s)), an ODR repository 282, an ODR index 283, filter capabilities 284, and match results 285. The database server 280 can also store or otherwise maintain one or more sets of rules, including semantic interpretation rules and categorization rules that the processor 210 at the server 205 can apply to evaluate data input into the system and classify such data according to one or more given classification systems, as further described herein. It should also be noted that, although database server 280 is depicted as being configured externally to the system server 205, in certain implementations, the database server 280 and/or any of the data elements stored therein can be located locally on the system server 205, or other remote computing devices, in a manner known to those of ordinary skill in the art.

The server 205 can be arranged with various hardware and software components that enable operation of the system 200, including a hardware processor 210, a memory 220, storage and a communication interface 250. The processor 210 serves to execute software instructions that can be loaded into and from the memory 220. The processor 210 can comprise one or more processors, a multi-processor core, or some other type of hardware processor, depending on the particular deployment of the system.

Preferably, the memory 220 and/or the storage are accessible by the processor 210, thereby enabling the processor 210 to receive and execute instructions stored on the memory 220 and/or on the storage. The memory 220 can be, for example, a random-access memory (RAM) or any other suitable volatile or non-volatile computer readable storage medium. In addition, the memory 220 can be fixed or removable. The storage can take various forms, depending on the particular implementation. For example, the storage can contain one or more components or devices such as a hard drive, a flash memory, a rewritable optical disk, a rewritable magnetic tape, or some combination of the above. The storage also can be fixed or removable or remote such as cloud-based data storage systems.

The one or more software modules are encoded in the storage and/or in the memory 220. The software modules can comprise one or more software programs or applications having computer program code or a set of instructions for execution by the processor 210. The software modules can be closely integrated with the operation and configuration of the physical hardware aspects of one or more implementations herein.

Such computer program code or instructions for carrying out operational aspects of the systems and methods disclosed herein can be written in any combination of one or more programming languages. The program code can execute entirely on the server 205, partly on the server 205, as a stand-alone software package, partly on the system server 205 and partly on a remote computer/device (e.g., the database server 280), or entirely on the remote computing devices. In the latter scenario, the remote devices can be connected to the system server 205 through any type of network, including a local area network (LAN) or a wide area network (WAN), or the connection can be made to an external computing system (for example, through the Internet using an Internet Service Provider).

It can also be said that the program code of the software modules and one or more of the non-transitory computer readable storage devices (such as the memory 220 and/or the storage) form a computer program product that can be manufactured and/or distributed in accordance with the present disclosure, as is known to those of ordinary skill in the art. It should be understood that in some illustrative embodiments one or more of the software modules can be downloaded over a network to the storage from another device or system, e.g., remote data storage, via communication interface 250 for use within the system 200. In addition, it should be noted that other information and/or data relevant to the operation of the present systems and methods can also be stored on the storage.

A communication interface 250 is also operatively connected to the processor 210 and can be any interface that enables communication between the server 205 and external devices, machines and/or elements. Preferably, the communication interface 250 includes, but is not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, and/or any other such interfaces for connecting system server 105 to other computing devices and/or communication networks, such as private networks and the Internet. Such connections can include a wired connection or a wireless connection (e.g., using the IEEE 802.11 standard), though it should be understood that communication interface 250 can be practically any interface that enables communication to/from the server 205.

Although the system 200 is described in reference to individual devices, such as the server 205, it should be understood that the system is configured to interact with any number of computing devices, local and remote, providing data to and receiving information from such devices. It should be understood that any of the remote computing devices depicted in FIG. 2 can be in direct communication with one-another or the server 205, indirect communication with one-another or the server 205, and/or can be communicatively coordinated with one-another or the system server 205 through a computer network, such as the Internet, a LAN, or a WAN.

Figure 3A:
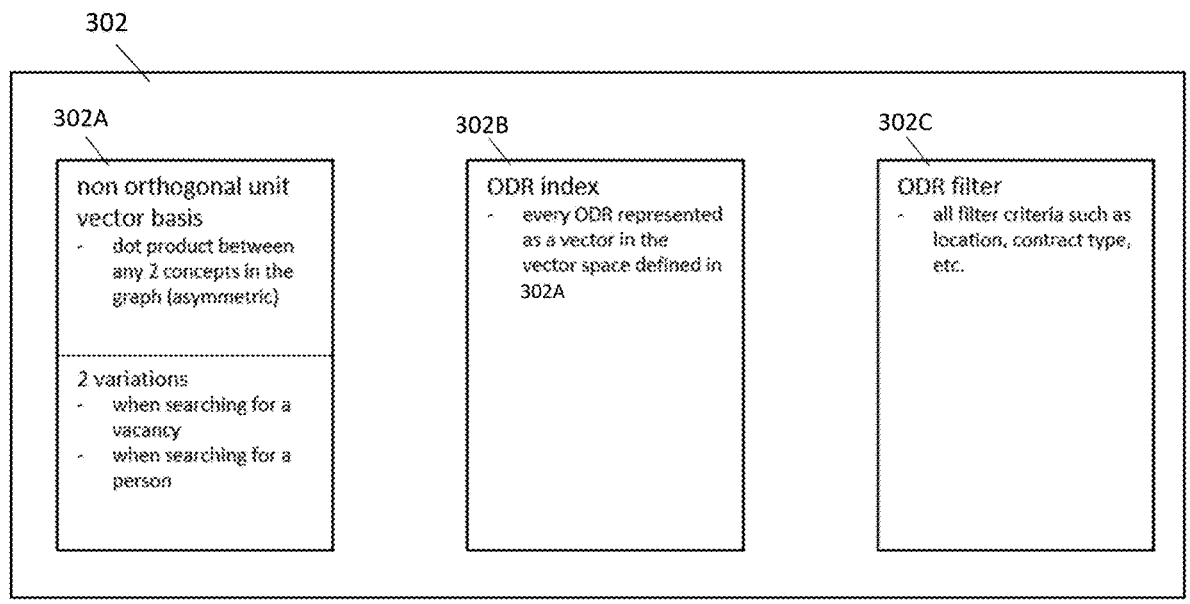
FIG. 3A is a block diagram illustrating a plurality of data storage structures including three schemes and usable in one or more processes shown and described herein.

Turning now to FIG. 3A, data tables 302 are illustrated, which include three schemes 302A, 302B, and 30C, respectively, and can be configured as data structures (e.g., tables in the database) and usable in one or more processes shown and described herein. As described herein, two principle processes are used: one for creating an ODR and one for matching. Scheme 302A can include records associated with a non-orthogonal unit vector space, scheme 302B can include records associated with ODR index, and scheme 302C include records associated with ODR filters. Two additional data structures are further supported, including an ODR repository and a data structure containing the matching results, which are described in greater detail below.

Figure 4:
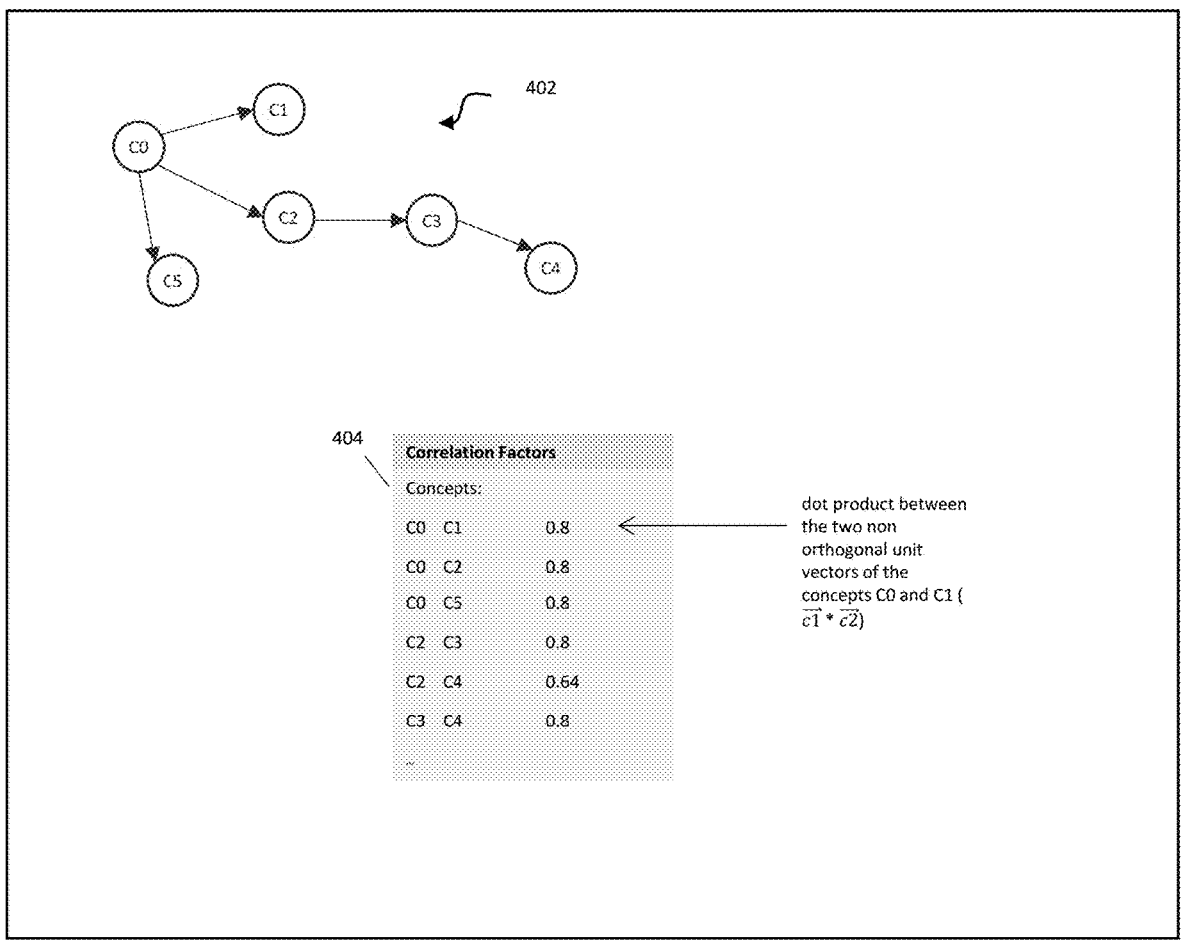
FIG. 4 is a block diagram illustrating an example of unit vectors representing ontology, from which the dot products are determined.

Data structure 302A, a non-orthogonal unit vector basis, can include a dot product between any two concepts in the graph (asymmetric). As used herein, the term asymmetry (or asymmetric) refers to matching scores being different depending on a particular direction of comparison, and to concepts having different correlation coefficients between them, such as depending on the direction of the relationship. Two variations can be supported, including when searching for a vacancy, and when searching for a person. The vector space can be defined by stating all of the correlations between each possible combination of concepts as they are found in the ontology. The correlations can be, in turn, defined by a dot product between any two concepts in the knowledge graph, such as shown and described in greater below. Once the vector space is built, an ODR can be specified in terms of the unit vector space, as a linear combination of non-orthogonal unit vectors. An example of unit vectors representing ontology, from which the dot products are determined, is illustrated in FIG. 4.

It is to be understood that dot products are not necessarily commutative interchangeable, at least because of at least two different points of view. For example, consider two professionals: programmer, and PYTHON programmer. A correlation (e.g., similarity) between these two can be calculated as follows, for example, depending on the direction of comparison:

PYTHON programmer→programmer=0.8
programmer→PYTHON programmer=0.6

Continuing with this example, while a PYTHON programmer may be very similar to a general programmer, a general programmer may not be very versed in PYTHON and, hence, not very similar to a PYTHON programmer. This example identifying peculiarities in industry illustrates why a comparison between two specific ODR's can result in different matching scores, depending on the direction of comparison. For example, the matching score may be not the same for a company offering a vacancy to a candidate, as for the candidate towards the vacancy of the company as is addressed in scheme 302A with variations, even though the variations are not limited to those listed under scheme 302A.

Notwithstanding variations, such as described above, it is envisioned that a specific match is executed in one direction. Usually, the direction is from a single ODR (in one data set) to a large amount of other ODR's (in another data set). It is to be appreciated, however, that in addition to a one-to-many comparison is typical, the present application supports many-to-many comparisons as well.

Referring to creation of a non-orthogonal unit vector space, a data structure (e.g., a table) containing unit vector space information contains information implied from the concepts in the ontology, but not necessarily an ODR itself. In this regard, the structure containing unit vector space information is thus independent from the ODR index and the ODR filters. In one or more implementations, the non-orthogonal unit vector space data structure is re-calculated on a periodic and/or regular basis, such as upon creation of a new concept in the ontology. In one or more implementations, dot products between concepts that are equal to 0 are not stored in data structure 302A, for example, despite many dot products between concepts being equal to 0.

Figure 3B:
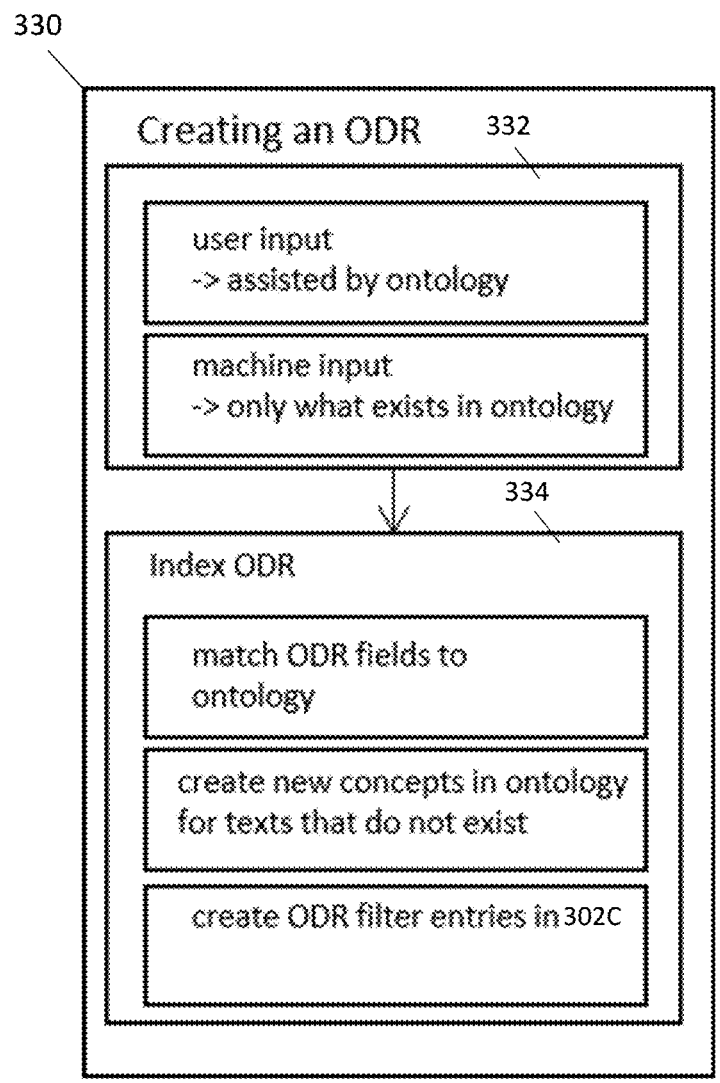
FIG. 3B illustrates a series of steps associated with a process for creating an occupational data record, in accordance with an example implementation of the present application.

Referring now to FIG. 3B, a process of creating an ODR is described, which can be considered to be both a process and a precondition for matching. Upon creating and indexing an ODR, data structures 302B and 302C (FIG. 3A) are populated. Steps 330 associated with the process of creating the ODR are illustrated in the simple block diagram of FIG. 3B.

In various implementations of the present application, an ODR can be created (step 332) by receiving input from a user (e.g., manual input) or can be created substantially automatically (e.g., machine input). The fields to specify can be associated with occupational topics, such as occupation, skills, a contract type, or the like. Thereafter, an indexing process for an ODR occurs (step 334), in which predefined fields can be matched to the ontology. For any texts that do not yet exist, new concepts are being created automatically in the latter. Furthermore, for the filters used in this ODR, filter entries are created accordingly in data scheme 302C. Continuing with reference to the example process of indexing an ODR 334 shown in FIG. 3B, ODR fields are matched to ontology. Thereafter, new concepts are created in ontology for texts that do not yet exist. Moreover, new ODR filter entries are created in data scheme 302C.

During indexing, each of the ODR's in the ODR repository can be represented as vectors whose components are unit vectors in the vector space defined by data structure 302A. Furthermore, each vector component of an ODR can be multiplied by a weight based on a weighting system which builds upon the occupation class associated to the ODR, such as described in greater detail, below. For example, whether an occupation description concept of the ODR belongs to an OC 1 is given to a "math teacher of advanced mathematics," or to an OC 5 for a "project manager" plays an essential role when weighting the concepts of the ODR. In other words, depending on the occupation class, weights given to the corresponding concepts within the ODR can be distributed in different manners, for example, in consideration of an importance of a certain skill, a specialization, a user's experience, or the like. Further, weights can be assigned in consideration of the importance of a certain skill(s) with regard to a specific occupation. Table 1, below includes exemplary weights that can be used during a process of indexing an ODR. For example, an occupational class values, occupation weights, function weights, specialization weights, skill weights, and language weights, as well as corresponding textual descriptions are provided in Table 1.

TABLE 1

| OC | Occupation | Function | Specialization | Skill | Language | Description |
|---|---|---|---|---|---|---|
| 1 | 4.28 | 3.17 | 2.67 | 2.61 | 3.3 | very specific (example: bricklayer, java programmer) |
| 2 | 3.7 | 2.15 | 2.53 | 4.84 | 2.74 | rather specific (example: gardener) |
| 3 | 3.1 | 4.55 | 1.91 | 1.63 | 2.31 | in between (example: nurse) |
| 4 | 3.89 | 4.33 | 2.12 | 3.23 | 2.82 | rather unspecific (example: architect) |
| 5 | 4.18 | 4.12 | 1.32 | 2.22 | 4.41 | very unspecific (example: consultant, project manager) |

When an ODR is indexed, the data structures 302B and 302C get populated substantially automatically. In one or more implementations, data structures can be populated using SQL database queries acting on batches of 1000 ODRs. Two queries are executed, such as one for the index structure (302B) and one for the filter structure (302C). In one or more implementations, the ODR index table depends on a respective data structure representing the vector space (data structure 302A), and an ODR index is refreshed on a periodic and/or regular basis as well. This implies also, that if one or more changes to data occur in data structure 302A, such as changes due to new concepts or changes in one or more concepts, a re-indexing is performed to base on the latest state of the ontology. In one or more matching processes, an ODR can be dynamically created to compare with one or more (potentially all) other ODR's and is indexed. In one or more implementations, the vector is not saved in the ODR index table nor in the ODR filter. Instead, the data are used only temporarily while performing the match.

With reference now to the ODR filter, a data structure 302C operates as a storage for filter criteria of created ODR's which reside in the ODR repository. Example filter types can include location, industry, contract type (e.g., full-time, part-time, contract, etc.), tags, the exclusion of a specific concept, keyword or not keyword, ODR type and date published. When an ODR is created, its applied filters can be stored in the ODR filter table (e.g., data structure 302C) substantially automatically.

Figure 3C:
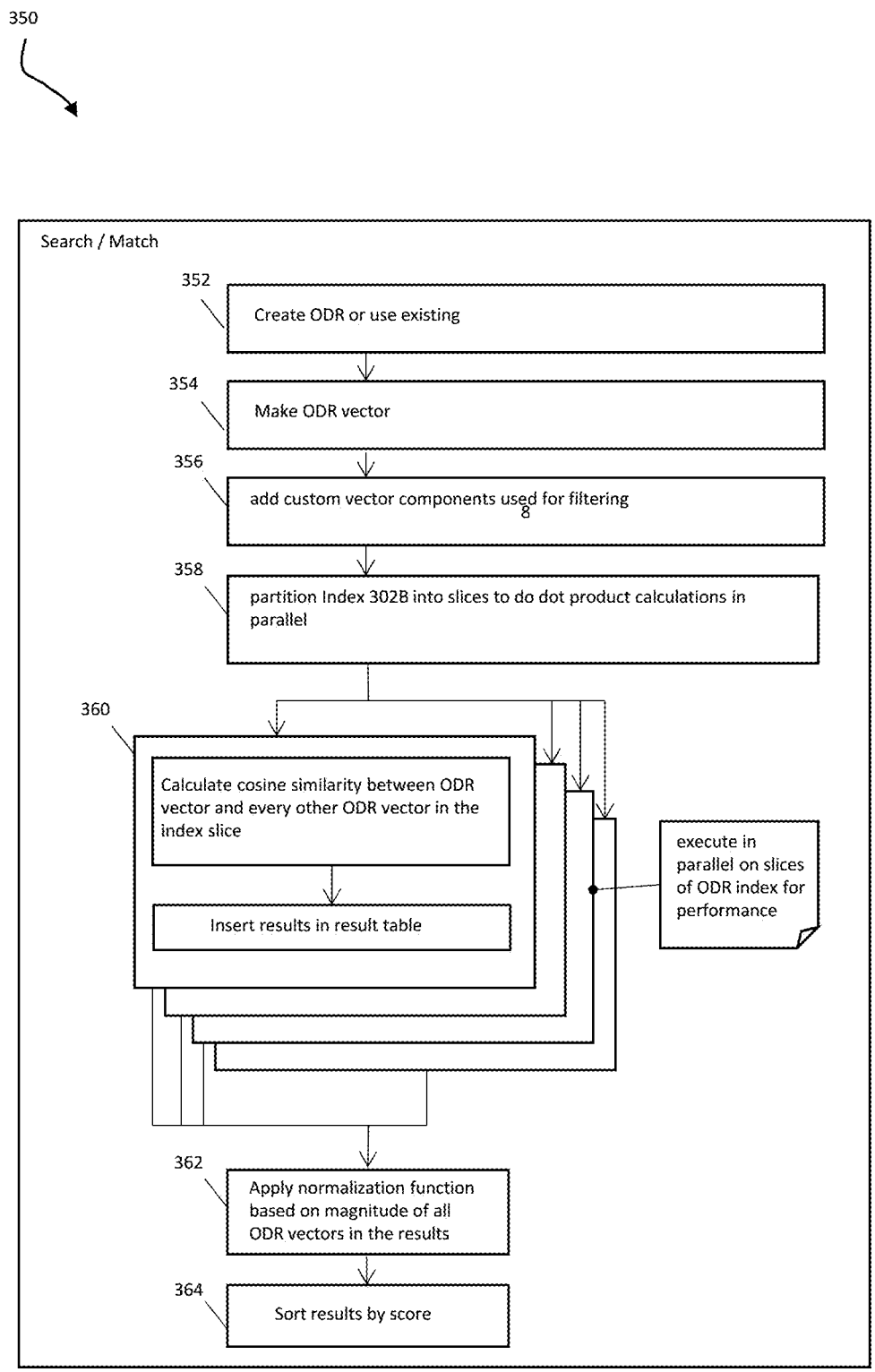
FIG. 3C is a high-level flow diagram that illustrates a routine for vector matching, including with regard to parallel execution, in accordance with one or more implementations.

Turning now to FIG. 3C, a high-level flow diagram is shown that illustrates a routine 350 for vector matching, including with regard to parallel execution in accordance with system 100, in accordance with one or more implementations. In addition to the high-level flow shown in FIG. 3C, particular details associated with one or more algorithms associated with vector matching, including cosine similarity, match/search, normalization and cosine similarity constant shift, are described herein.

In the beginning of the process depicted in FIG. 3C, a new data set is created, or a pre-existing data set is used, that contains all ODR's (typically a large amount) used, for which a single ODR is going to be compared to (step 352). Each ODR in a respective data set is represented as a vector of the non-orthogonal unit vector space, with the indexed ODR vectors being stored in ODR index and the filters in ODR filters (step 354). The second data set can be initiated, for example, where only one ODR with which all others are going to be compared is created dynamically from an existing ODR or by creating a new, temporary ODR at query time. Thereafter, at step 356, a single ODR vector is created (indexed) while creating an ODR vector without storing it in the ODR index. Likewise, the custom vector components used for filtering of that single vector are created without storing it in ODR filters. Thereafter, the ODR index vector data is partitioned into slices to enable parallel processing when calculating the cosine similarity between the single ODR vector and every other ODR vector (step 358). An example applied formula for the cosine similarity calculation is defined with Equation 5, below. After computing the cosine measures, the results are inserted in the match results table (step 360). A normalization function is based on magnitudes of all ODR vectors is, thereafter, applied (step 362), and the results are output to a sorted score results list (step 364). Values in the score results list are ideally in the range between 0 and 1. As used herein, the term, magnitude, can refer, generally, to a weight applied to a specific occupational concept within an occupational data record based on the given occupation class. Moreover, the term, occupational concept, as used herein generally is derived from the ontology and represents a data point representing occupational information. Occupational concept can include different attributes (e.g. labels in different languages) and, in the case of a concept representing an occupation description, can include an associated occupation class. An occupational concept therefore may represent a concrete skill, soft-skill, specialization, occupation title, experience, industry, language, salary range, working condition or any other occupational information. Concepts and their relations are stored in an ontology. In one or more implementations, a concept is formatted to include a unique id.

As noted, the ontology represents the hierarchy of concepts within one or more occupation classification systems and, importantly, the interrelationships between concepts and a concept graph is an exemplary logical representation of the interrelationships between concepts in the ontology. FIG. 4 illustrates example of unit vectors representing ontology, from which the dot products are determined. Knowledge graph 402 illustrates relationships between concept (e.g., nodes) C0-C5. Correlation factors 404 identify the concepts and the respective dot products between the two non-orthogonal unit vectors of the concepts. For example, of concepts C0 and C1 in FIG. 4, the dot product is 0.8.

Figure 5:
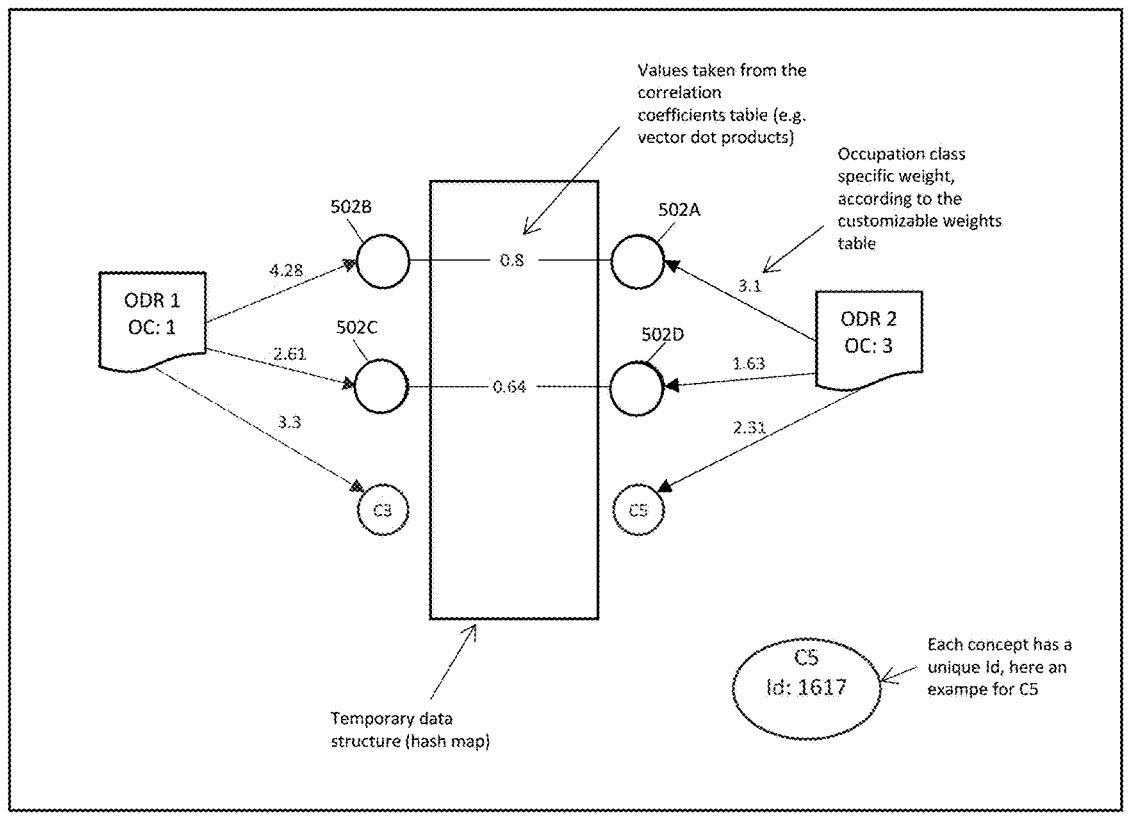
FIG. 5 is an illustration of an exemplary concept graph comprising a directed graph of concept nodes, each corresponding to a respective concept, in accordance with an example implementation.

FIG. 5 is a simplified illustration of an exemplary concept graph comprising a directed graph of concept nodes, each corresponding to a respective concept. More particularly, FIG. 5 illustrates correlation values of common or similar concepts (502A, 502B, 502C, and 502D) between two ODR's just prior to calculating the cosine similarities. Returning to the previous example regarding a PYTHON programmer, 502B is the PYTHON programmer compared towards a general programmer 502A, 502C represents skills associated with writing SQL statements compared to designing relational databases 502D. Prior to the calculation, these common concepts and respective correlation coefficients can be identified as a function of a precalculated correlation coefficients table. In this regard, relationships between concepts can be already represented, thus eliminating a need to traverse the knowledge graph during a matching process. The correlation coefficients of the identified common concepts, originating from 302A, and can be temporarily stored at execution time (e.g., in RAM) using a hash map (or other suitable function) for the calculation.

The output of the semantic matching process is a list of cosine similarity scores, sorted by the highest outcome first. The results comprise a custom threshold value, only listing results above that threshold on the client system. The resulting cosine measures are returned as percentage values which are obtained from the normalized results, where 100% represents a perfect match. As previously mentioned, there are multiple parameters which can be adapted to fit the matching process to the conditions of the local occupational market, such as filtering criteria and by defining different weights for the various concept types, including the occupation.

The present application provides output from the semantic matching process, which can include a list of cosine similarity scores. The list can be sorted in various suitable ways, such as by the highest outcome first. These results include a custom threshold value, providing only listing results above the custom threshold on the client system. Resulting cosine measures are returned as percentage values which are obtained from the normalized results, in which a value of 100% represents a perfect match. As noted herein, multiple parameters can be adapted to fit the matching process to the conditions of the local occupational market, such as filtering criteria and by defining different weights for the various concept types, such as occupation.

The present application is now further described in particular detail with an example implementation that includes a vector matching algorithm, a match and search algorithm, and an algorithm in connection with a cosine similarity constant shift. Using other features of the present application are described with reference to objects, such as occupational concepts. Some objects can be quite complex, such as a complex vector and/or a comprehensive collection of interrelated concepts.

Referring to an example vendor matching algorithm, in one or more implementations, matching is performed by expressing objects as vectors and measuring the closeness between vectors by the cosine between them. This is referred to herein, generally, as "cosine similarity" or "soft cosine measure." For illustrative purposes, the vendor matching algorithm is described using common linear algebra and, accordingly, one of ordinary skill will recognize that the vendor matching algorithm can be generic. When objects are expressed as vectors, matching vectors equates to matching objects. Virtually any type of entity can be matched using an algorithm such as shown and described herein, when such objects can be expressed as vectors.

With reference now to an example vendor matching algorithm, two given vectors $\vec{a}$ and $\vec{b}$ represent entities having magnitude and direction), and having a dot product:

$$\vec{a} \cdot \vec{b} = |\vec{a}||\vec{b}|\cos\theta_{ab} \quad \text{(Equation 1)}$$

where $|\vec{a}|$ is the magnitude, or length, of vector $\vec{a}$ and $\theta_{ab}$ is the angle between the directions of $\vec{a}$ and $\vec{b}$. Example dot product properties, such as:

$\vec{a} \cdot \vec{b} = 1 \Rightarrow \vec{a} = \vec{b}$ and $\vec{a} \cdot \vec{b} = 0 \Rightarrow$ the vectors are known as orthogonal, independent, or perpendicular. The vector magnitude can be calculated using the dot product:

$$\vec{a} \cdot \vec{a} = |\vec{a}||\vec{a}|\cos 0 \Rightarrow |\vec{a}| = \sqrt{\vec{a} \cdot \vec{a}} \quad \text{(Equation 2)}$$

The Vector magnitude, direction and $\theta_{ab}$ can be visualized up to three dimensions, but the same properties can extend to higher dimensions.

From the above two equations, the cosine similarity between $\vec{a}$ and $\vec{b}$ is:

$$\cos\theta_{ab} = \frac{\vec{a} \cdot \vec{b}}{|\vec{a}||\vec{b}|} = \frac{\vec{a}}{\sqrt{\vec{a} \cdot \vec{a}}} \cdot \frac{\vec{b}}{\sqrt{\vec{b} \cdot \vec{b}}} = \hat{a} \cdot \hat{b} \quad \text{(Equation 3)}$$

In the above equation, $\hat{a}$ represents a unit (length) vector in direction of $\vec{a}$. It will be evident to one of ordinary skill that the dot product is the basic operation used to calculate the cosine similarity. In case of non-unit vectors, it can take 3 dot product operations, while in case of unit vectors, the cosine similarity can be the dot product itself. Given that the dot product can be a fairly expensive operation, significant practical savings may be obtained by normalizing all vectors as soon as possible; this also simplifies the equations.

Given a complete vector basis covering the full vector space of interest, composed of K not-necessarily orthogonal unit vectors, $\hat{k}_1, \hat{k}_2, \ldots, \hat{k}_K$, then vectors $\vec{a}$ and $\vec{b}$ can be expressed (not necessarily uniquely) as:

$$\vec{a} = a_1\hat{k}_1 + a_2\hat{k}_2 + \ldots + a_K\hat{k}_K$$

$$\vec{b} = b_1\hat{k}_1 + b_2\hat{k}_2 + \ldots + b_K\hat{k}_K$$

Accordingly, a practical formula to calculate the dot product is:

$$\vec{a} \cdot \vec{b} = \sum_{i=1}^{K} \sum_{j=1}^{K} a_i b_j \hat{k}_i \cdot \hat{k}_j \quad \text{(Equation 4)}$$

where $a_i$, $a_j$ are real numbers, $\hat{k}_i$, $\hat{k}_j$ may not be directly known, but instead their dot products, $\hat{k}_i \cdot \hat{k}_j$ may be known, which are real numbers in the range $[-1.0, +1.0]$.

For unit vectors, combining equations 3 and 4:

$$\cos\theta_{ab} = \hat{a} \cdot \hat{b} = \sum_{i=1}^{K} \sum_{j=1}^{K} a_i b_j \hat{k}_i \cdot \hat{k}_j \quad \text{(Equation 5)}$$

Referring to a vector matching algorithm, in accordance with an example implementation of the present application, two sets of unit vectors are given: $A = \{\hat{a}_1, \hat{a}_2, \ldots, \hat{a}_M\}$ and $B = \{\hat{b}_1, \hat{b}_2, \ldots, \hat{b}_N\}$, compute, using (Equation 5), all triplets $(m, n, \hat{a}_m \cdot \hat{b}_n)$, $m = 1 \ldots M$, $n = 1 \ldots N$ in a list sorted by decreasing $\hat{a}_m \cdot \hat{b}_n$. Preferably, the best result will be found at the beginning of the list, where the best possible result $\hat{a}_m \cdot \hat{b}_n = 1$, if exists, would indicate a perfect match. In many practical cases, set A consists of a single vector, while set B is very large.

It will be evident to one of ordinary skill that the more familiar and intuitive vector bases are those where a minimum number of orthogonal unit vectors are chosen to cover a vector space of a given dimension: i.e. two vectors for two dimensions, corresponding to the x and y axes, and three vectors for three dimensions, corresponding to the x, y and z axes. This is referred to herein, generally, as an orthonormal basis. When two vectors are expressed in an orthonormal basis, given (1) and (2), above, equation (4B) reduces to the more familiar formula for dot product in an orthonormal basis:

$$\vec{a} \cdot \vec{b} = \sum_{i=1}^{K} a_i b_i \qquad \text{(Equation 4B)}$$

Even in cases in which such a linear vector space is of very high dimensions, having an orthonormal basis in which the non-orthonormal basis vectors $\hat{k}_i$ would be expressed.

Figure 6:
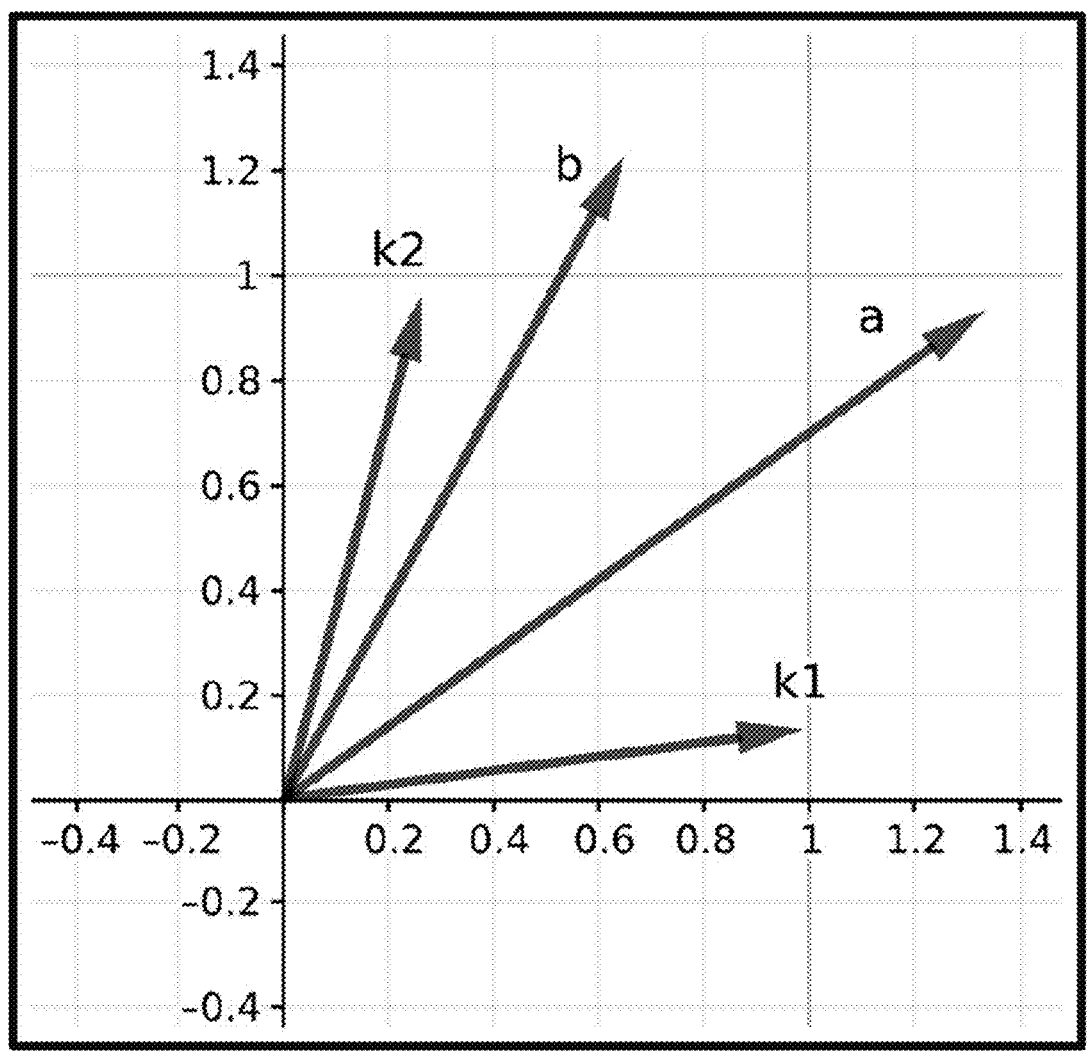
FIG. 6 shows an example graph of 2D vector space, including unit vectors in directions of positive x and y axes.

In FIG. 6, the vectors shown in the graph are:

$\hat{k}_1 = 0.9911\hat{i} + 0.1330\hat{j}$ $\hat{k}_2 = 0.2622\hat{i} + 0.9650\hat{j}$ $\vec{a} = 1.3382\hat{i} + 0.9352\hat{j}$ $\vec{b} = 0.6488\hat{i} + 1.2307\hat{j}$ where $\hat{i}$ and $\hat{j}$ are the orthonormal basis: unit vectors in directions of positive x and y axes.

Continuing with this example shown in FIG. 6, vectors $\vec{a}$ and $\vec{b}$ can be expressed in terms of $\hat{k}_1$ and $\hat{k}_2$ by solving a linear system:

$$\begin{pmatrix} a_1 & a_2 \\ b_1 & b_2 \end{pmatrix} \begin{pmatrix} 0.9911 & 0.1330 \\ 0.2622 & 0.9650 \end{pmatrix} = \begin{pmatrix} 1.3382 & 0.9352 \\ 0.6488 & 1.2307 \end{pmatrix}$$

$$\begin{pmatrix} a_1 & a_2 \\ b_1 & b_2 \end{pmatrix} = \begin{pmatrix} 1.3382 & 0.9352 \\ 0.6488 & 1.2307 \end{pmatrix} \begin{pmatrix} 0.9911 & 0.1330 \\ 0.2622 & 0.9650 \end{pmatrix}^{-1}$$

$$= \begin{pmatrix} 1.1352 & 0.8127 \\ 0.3292 & 1.2300 \end{pmatrix}$$

i.e.

$\vec{a} = 1.1352\hat{k}_1 + 0.8127\hat{k}_2$ $\vec{b} = 0.3292\hat{k}_1 + 1.2300\hat{k}_2$ In the above expression, $\vec{a} \cdot \vec{b}$ can be calculated using Equation (4), knowing only the above two equations plus the value of $\hat{k}_1 \cdot \hat{k}_2$. Equation 4B can be used to calculate $\hat{k}_1 \cdot \hat{k}_2$ but in practice a real value in the range [−1.0, +1.0] can be assigned, such as described below in connection with the match/search algorithm.

$\hat{k}_1 \cdot \hat{k}_2 = (0.9911)(0.2622) + (0.1330)(0.9650) = 0.3882$ $\vec{a} \cdot \vec{b} = (1.1352)(0.3292)(1) + (1.1352)(0.2300)(0.3882) + (0.8127)(0.3292)(0.3882) + (0.8127)(1.2300) = 2.0192$ This can be verified using Equation 4B as follows:

$\vec{a} \cdot \vec{b} = (1.3382)(0.6488) + (0.9352)(1.2307) = 2.0192$

The vector matching algorithm described above is applicable to matching and searching objects, by expressing each individual object as a vector. In Equation 5, above, $\hat{a}$ and $\hat{b}$ represent two different objects. Each object vector can be defined as a linear combination of the K non-orthogonal unit basis vectors, corresponding to the K concepts in the concept graph, shown and described herein with reference to FIG. 5. In Equation 5, $\hat{k}_i$ and $\hat{k}_j$ represent two different concepts in the concept graph, $a_i$ represents the $i^{th}$ component of an object's unit vector $\hat{a}$ in direction $\hat{k}_i$, and similarly, $b_j$ represents the $j^{th}$ component of an object's unit vector $\hat{b}$ in direction $\hat{k}_j$. The following description regards to separate parts: basis vectors and object vectors Referring, initially, to basis vectors, a non-orthogonal unit vector basis is the set of K unit vectors, one for each concept in the concept graph: $\hat{k}_1, \hat{k}_2, \ldots, \hat{k}_K$. Although $\hat{k}_i$ may be unknown, all $\hat{k}_i \cdot \hat{k}_j$ are known. These dot products can be calculated almost exclusively from relationships defined in the concept graph. For example, a direct parent→child relationship has a high value, closer to the maximum value of 1.0, while a more distant grandparent→grandchild relationship has a lower value. These rules, determined empirically, provide good quality results, and do not cover the commutative property of dot products, i.e., $\hat{k}_i \cdot \hat{k}_j \ne \hat{k}_j \cdot \hat{k}_i$.

In addition to formulas which depend on relationships set forth in the concept graph, other values of $\hat{k}_i \cdot \hat{k}_j$ can be added manually. Notwithstanding any particular calculation method, the collection of all explicitly calculated values of $\hat{k}_i \cdot \hat{k}_j$, along with an implicit value of zero for all missing combinations, a basis is provided to calculate equation (5) and thus perform the vector matching algorithm. In one or more implementations, the majority of $\hat{k}_i \cdot \hat{k}_j$ are implicitly zero. Accordingly, non-zero values are stored as triplets (i, j, $\hat{k}_i \cdot \hat{k}_j$).

The following example (Example 2) regards an application of the present application in connection with two concepts: programmer ($\hat{k}_{121}$) and PYTHON programmer ($\hat{k}_{358}$), where PYTHON programmer⇒programmer=0.8 ($\hat{k}_{358} \cdot \hat{k}_{121} = 0.8$) and programmer⇒PYTHON programmer=0.6 ($\hat{k}_{121} \cdot \hat{k}_{358} = 0.6$). The triplets, (358, 121, 0.8) and (121, 358, 0.6) are preferably stored.

In one or more implementations, an object vector set includes a set of N vectors, one for each object in the system: $\vec{j}_1, \vec{j}_2, \ldots, \vec{j}_N$. Information regarding a respective object is matched to a corresponding concept in the concept graph: $\hat{k}_{nk}$, where subscripts n and k refer to the particular object and concept, respectively. In one or more implementations, $\hat{k}_{nk}$ can be multiplied by a weight, $w_{nk}$, and added to the object vector. The weight can be a combination of rules, including to take into account a relative importance for a given piece of information, including as specified by the user. Accordingly, an object vector can be defined as follows:

$\vec{j}_n = w_{n1}\hat{k}_1 + w_{n2}\hat{k}_2 + \ldots + w_{nk}\hat{k}_k + \ldots + w_{nK}\hat{k}_K$ Moreover, and as noted herein, object vectors can be normalized early, stored and further processed as an object unit vector:

$$\hat{j}_n = \frac{1}{|\vec{j}_n|} \left( w_{n1}\hat{k}_1 + w_{n2}\hat{k}_2 + \cdots + w_{nk}\hat{k}_k + \cdots + w_{nK}\hat{k}_K \right)$$

In implementations of the present application, vast majority of $w_{nk}$ are equal to zero; therefore, in one or more implementations, only the non-zero components are stored, after normalization, as triplets (n, k, $w_{nk}/|\vec{j}_n|$) into a data structure (e.g., a table in database). Components which are not stored have an implicit value of zero.

The following example (Example 3) regards an application of the present application in connection with a job offer for a PYTHON programmer in Paris, France ($\vec{j}_{782}$), Weighting can include applying a weight having a value of 3.0 and French speaker ($\hat{k}_{18}$) with a weight value of 2.0, but can also consider a programmer ($\hat{k}_{121}$) who might not know PYTHON with a weighted value of 0.5.

The resulting equation can be:

$$\vec{j}_{782} = 3\hat{k}_{358} + 2\hat{k}_{18} + 0.5\hat{k}_{121}$$

The components of ($\vec{j}_{782}$) can be saved, such as in rows in a data table, (782, 358, 3/|$\vec{j}_{782}$|), (782, 18, 2/|$\vec{j}_{782}$|), and (782, 121, 0.5/|$\vec{j}_{782}$|). One of ordinary skill can appreciate that, in accordance with Equations 2 and 4, |$\vec{j}_{782}$| depends on the correlation between PYTHON programmer and programmer, as described in the previous example, i.e., $\hat{k}_{358} \cdot \hat{k}_{121}$ and $\hat{k}_{121} \cdot \hat{k}_{358}$. As dot products change, the rows (or other data storage) are recalculated. In one or more implementations, one respective database table can be configured to store information directly entered regarding objects, and not necessarily information implied through the concept graph, which can be stored in a separate data source (a data table). Moreover, in one or more implementations, a vector matching algorithm in accordance with the present application can be applied to combine both sources of information, as the dot product is calculated, such as using Equation (5).

Turning now to a discussion regarding cosine similarity constant shift, low-overhead filtering is added to the vector matching algorithm, shown and described herein. In particular, the following equation (6) is applicable, given a unit vector $\hat{k}_f$ orthogonal to both $\hat{a}$ and $\hat{b}$, and a real number, D:

$$(\hat{a} + D\hat{k}_f) \cdot (\hat{b} + \hat{k}_f) = \hat{a} \cdot \hat{b} + \hat{a} \cdot \hat{k}_f + D\hat{k}_f \cdot \hat{b} + D\hat{k}_f \cdot \hat{k}_f \quad \text{(Equation 6)}$$

$$= \hat{a} \cdot \hat{b} + D$$

Referring to the previously described vector matching algorithm, a small set A={$\hat{a}_m$}, m=1 ... M and a very large set B={$\hat{b}_n$}, n=1 ... N. Accordingly, two new sets can be created: A'={$\hat{a}'_m = \hat{a}_m + D\hat{k}_f$} and B'={$\hat{b}'_n = \hat{b}_n + f(\hat{b}_n)\hat{k}_f$}, where D is a real number >1 and $f(\hat{b}_n)$ is a filtering function which evaluates to 1 if $\hat{b}_n$ passes a certain condition or to −1, otherwise. Thereafter, Equation 6 can be applied and the vector matching algorithm on A' and B' can produce a sorted list of triplets (m, n, $\hat{a}_m \cdot \hat{b}_n \pm D$), m=1 ... M, n=1 ... N. Dropping all negative results and subtracting D from the remaining results produces the smaller list (m, n, $\hat{a}_m \cdot \hat{b}_n$) in the same order and without altering the cosine similarity. In practice, obtaining set A' from A does not result in a performance problem because the set is small, including a single vector. The result of this technique is to provide an efficient filtering-and-match operation, when set B could be very large. Obtaining set B' from B is implemented, for example, by executing a union query with a plurality of tables during a match/search process to dynamically add one single row (n, F, $f(\hat{b}_n) = \pm 1$)) for each distinct object unit vector, denoted by n. Further, F is a constant corresponding to the fully-independent basis vector, $\hat{k}_f$, i.e., $\hat{k}_f \cdot \hat{k}_i = 0$ for all i=1 ... K concepts in the concept graph.

Although cosine similarity provides good and fair matching results, in some cases, the real-world usage of features of the present application are not well represented. This can occur for users who supply significant information, such as skills, languages, education, etc. During a search, for example, for specific job positions, the returned search results increase, notwithstanding calculated scores for each job would be lower than had the user targeted just a given one job. A possible shortcoming can occur, however, for job providers searching for potential candidates to fill available positions. Those candidates having a rich data set (and who are arguably better suited for particular positions) can score lower than those with only a few concepts but that more closely match a respective job description. This, in turn, could have an unintended effect of penalizing people for being too descriptive in their profiles, despite possibly being instructed to be as descriptive as possible.

Accordingly, alongside the cosine similarity match process, one or more implementations of the present application can apply the following normalization factor to correct for shortcomings, such as described above:

$$S = \frac{|\vec{j}_s|}{|\vec{j}_o|}$$

where $\vec{j}_s$ is the search vector and $\vec{j}_o$ is a vector representing a respective job offer, prior to normalizing, for any pair of search results. Magnitudes of non-normalized vectors can be used, which can be cached, for example, during use.

Continuing with normalization processes, cosine similarity equation (e.g., Equation 3) and replacing $\vec{a}$ and $\vec{b}$ with $\vec{j}_s$ and $\vec{j}_o$, respectively, a score adjustment factor can be applied, such as in the following example:

$$\cos\theta_{j_s j_o} S = \frac{\vec{j}_s \cdot \vec{j}_o}{|\vec{j}_s||\vec{j}_o|} * \frac{|\vec{j}_s|}{|\vec{j}_o|} = \frac{\vec{j}_s \cdot \vec{j}_o}{|\vec{j}_o||\vec{j}_o|} = \frac{\vec{j}_s \cdot \vec{j}_o}{\sqrt{\vec{j}_o \cdot \vec{j}_o}\sqrt{\vec{j}_o \cdot \vec{j}_o}} = \frac{\vec{j}_s \cdot \vec{j}_o}{\vec{j}_o \cdot \vec{j}_o}$$

In the case that we are searching with a search vector $\vec{j}_0$, and displaying the score for a matched offer vector $\vec{j}_1$, the equation can be represented as follows:

$$S = \frac{|\vec{j}_0|}{|\vec{j}_1|}$$

$$\cos\theta_{j_0 j_1} S = \frac{\vec{j}_0 \cdot \vec{j}_1}{\vec{j}_1 \cdot \vec{j}_1}$$

where $\vec{j}_1 \cdot \vec{j}_1$ can be stored in, for example, a data table, from when a respective offer was indexed. Moreover, in the event that an offer vector $\vec{j}_o$ is being searched and the score for a matched search vector $\vec{j}_1$, s can change as follows:

$$S = \frac{|\vec{j}_1|}{|\vec{j}_0|}$$

$$\cos\theta_{j_0 j_1} S = \frac{\vec{j}_0 \cdot \vec{j}_1}{\vec{j}_0 \cdot \vec{j}_0}$$

where $\vec{j}_0 \cdot \vec{j}_0$ can be calculated before the matching query is executed and used in the query.

The exemplary systems and methods for matching described herein can be applied in any number of practical scenarios. Use cases can extend beyond a comparison between an open vacancy and a job search, and can include comparisons among open vacancies, among candidates (for example to look for a successor within a company, or to asses a continuous education program), to compare resumés, a comparison between worker profiles, for benchmarking, gap analysis and more.

In one illustrative example use-case, the matching system a government labor official needs to data mine and match her country's unemployed workers' profiles with each other. The labor official further needs to match them against open vacancies, thereby looking for the gaps between skills they possess compared to the job vacancy requirements of companies. The systems and methods described herein enable her to match people to positions, as well as to identify potential education and training requirements.

In another illustrative use-case, the matching systems and methods shown and described herein can be used by a company who matches the job requirements in their own adverts to those of their competitors because they want to compare their skill sets to a benchmark for that occupation within their respective industry. For example, the company seeks to identify the five most important skills for each occupation in comparison to the five most desired skills of other companies in a respective sector. The teachings herein provide tools that support such comparative analysis.

In another illustrative use-case, job seekers use the teachings herein to match their skills with other seekers of the same occupation. This supports a comparison study to identify where job seekers should improve their skills sets and experience and, thus, improve their profiles and employment opportunities.

In yet another illustrative use-case, a university applies the teachings herein to match the skills and subjects offered within a curriculum to the job requirements of the industry in the current labor. This enables a comparative analysis, including to identify future curriculum changes in order to better prepare students for industry needs.

In still another illustrative use-case, a job recruiter working for a company whose corporate strategy moves more towards diversity and inclusion uses the teachings herein to compare the specific requirements of open positions in her company with many different potential candidates globally. This extends the reach and functionality previously available for fulfillment.

On a larger scale, the exemplary systems and methods for matching can be executed on disparate types of occupation data, say, two sets of occupation data defined according to two different systems, so as to convert the different system data-sets to a common paradigm (e.g., a common set of concepts) and thereby enabling additional benchmarking, comparative analytics and other such operations to be performed across matching systems.

At this juncture, it should be noted that although much of the foregoing description has been directed to exemplary systems and methods for classifying occupational data and exemplary practical use-cases, the systems and methods disclosed herein can be similarly deployed and/or implemented in scenarios, situations, and settings far beyond the referenced scenarios.

It is to be understood that like numerals in the drawings represent like elements through the several figures, and that not all components and/or steps described and illustrated with reference to the figures are required for all embodiments or arrangements. It should also be understood that the embodiments and/or arrangements of the systems and methods disclosed herein can be incorporated as a software algorithm, application, program, module, or code residing in hardware, firmware and/or on a computer useable medium (including software modules and browser plug-ins) that can be executed in a processor of a computer system or a computing device to configure the processor and/or other elements to perform the functions and/or operations described below. It should be appreciated that according to at least one embodiment, one or more computer programs or applications that when executed perform methods of the present invention need not reside on a single computer or processor, but can be distributed in a modular fashion amongst a number of different computers or processors to implement various aspects of the systems and methods disclosed herein.

Thus, illustrative embodiments and arrangements of the present systems and methods provide a computer implemented method, computer system, and computer program product for assessing a degree of risk in a prescribing behavior record. The flowchart and block diagrams in the figures illustrate the architecture, functionality, and operation of possible implementations of systems, methods and computer program products according to various embodiments and arrangements. In this regard, each block in the flowchart or block diagrams can represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed is:

1. A computer-based method for determining similarity between at least two heterogenous unstructured data records and for optimizing processing performance, the method comprising:
generating, by at least one processor that is configured by executing code stored on non-transitory processor readable media, a plurality of occupational data records;
creating, by the at least one processor, for each of the occupational data records, a respective vector in an n-dimensional non-orthogonal unit vector space by calculating dot products between unit vectors corresponding to concepts from an ontology to represent the occupational data record;
slicing, by the at least one processor, each of the vectors into a plurality of chunks;
performing, by the at least one processor, semantic matching for each of the chunks in parallel to compare at least one occupational data record to at least one other occupational data record; and
outputting, by the at least one processor, values representing similarities between at least two of the occupational data records.

2. The method of claim 1, wherein each of the respective vectors has magnitude and direction.

3. The method of claim 1, further comprising applying correlation coefficients derived from information provided by an ontology.

4. The method of claim 1, further comprising weighting vectorially represented concepts.

5. The method of claim 1, further comprising storing information associated with dot products that are above zero or at least equal to a predefined threshold.

6. The method of claim 1, wherein the matching step includes performing asymmetric comparisons.

7. The method of claim 6, wherein the asymmetric comparisons are based on cosine similarity.

8. The method of claim 1, wherein the output is sorted based on degree of similarity.

9. A computer-based system for determining similarity between at least two heterogenous unstructured data records and for optimizing processing performance, the system comprising:
at least one processor configured to access non-transitory processor readable media, the at least one processor further configured, when executing instructions stored on the non-transitory processor readable media, to:
generate a plurality of occupational data records;
create, for each of the occupational data records, a respective vector in an n-dimensional non-orthogonal unit vector space by calculating dot products between unit vectors corresponding to concepts from an ontology to represent the occupational data record;
slice each of the vectors into a plurality of chunks;
perform semantic matching for each of the chunks in parallel to compare at least one occupational data record to at least one other occupational data record; and
output values representing similarities between at least two of the occupational data records.

10. The system of claim 9, wherein each of the respective vectors has magnitude and direction.

11. The system of claim 10, wherein the at least one processor is further configured to:
apply correlation coefficients derived from information provided by an ontology.

12. The system of claim 10, wherein the at least one processor is further configured to:
weight vectorially represented concepts.

13. The system of claim 9, wherein the at least one processor is further configured to:
store information associated with dot products that are above zero or at least equal to a predefined threshold.

14. The system of claim 9, wherein the matching step includes performing asymmetric comparisons.

* * * * *